H. NELSON.
STRAINER FOR MILK CANS.
APPLICATION FILED FEB. 12, 1912.

1,041,331.

Patented Oct. 15, 1912.

2 SHEETS—SHEET 1.

WITNESSES.
Paul A. Vjersen.
A. L. Walcutt

INVENTOR.
Herman Nelson
H. Danders
BY ATTY.

H. NELSON.
STRAINER FOR MILK CANS.
APPLICATION FILED FEB. 12, 1912.

1,041,331.

Patented Oct. 15, 1912.

2 SHEETS—SHEET 2.

WITNESSES
Paul A. Viersen.
A. L. Valcutt.

INVENTOR
Herman Nelson
H. Darden
BY
ATTY.

UNITED STATES PATENT OFFICE.

HERMAN NELSON, OF GOTHENBURG, NEBRASKA.

STRAINER FOR MILK-CANS.

1,041,331.  Specification of Letters Patent.  Patented Oct. 15, 1912.

Application filed February 12, 1912. Serial No. 676,941.

*To all whom it may concern:*

Be it known that I, HERMAN NELSON, a citizen of Sweden, residing at Gothenberg, in the county of Dawson and State of Nebraska, have invented certain new and useful Improvements in Strainers for Milk-Cans, of which the following is a specification.

This invention relates to improvements in strainers for milk cans and its object is to produce a device of this class that can be used as a fixture in a milk can.

Another object is to provide a simple and inexpensive strainer that will permit the milk or cream to be properly strained into a can or similar receptacle.

With the foregoing and other objects in view the invention consists in the combination and arrangement of parts to be hereinafter fully described in the following specification, pointed out in the claim and illustrated in the accompanying drawings in which—

Figure 1:
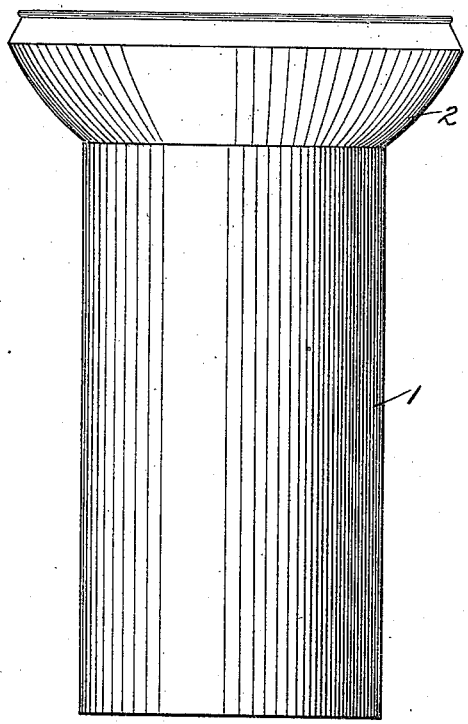
Figure 2:
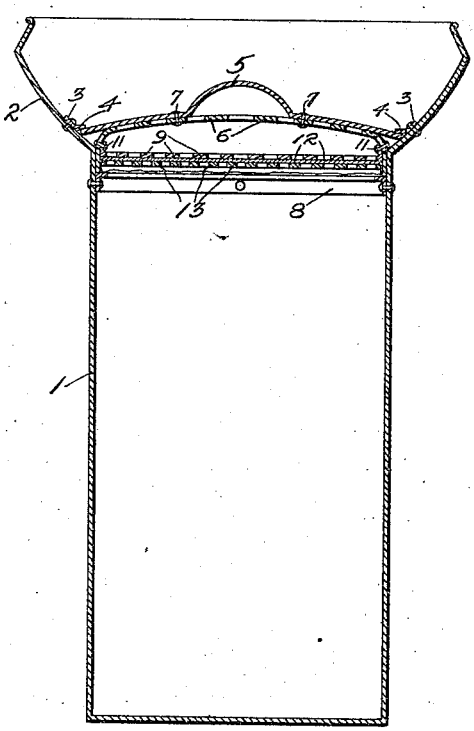
Figure 3:
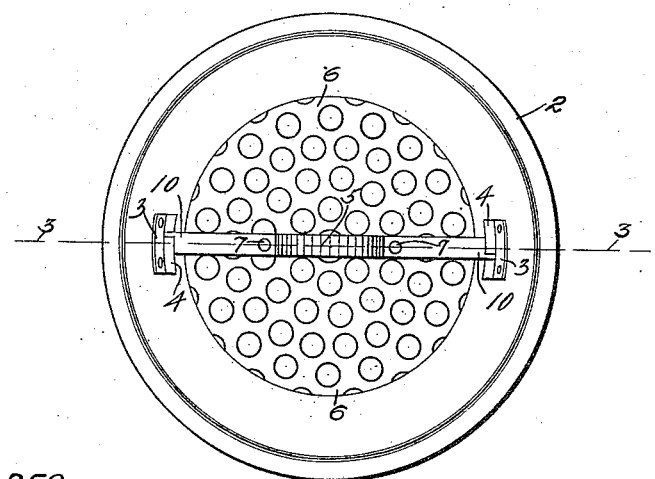
Figure 4:
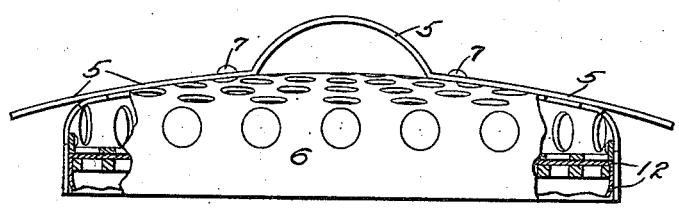
Figure 5:
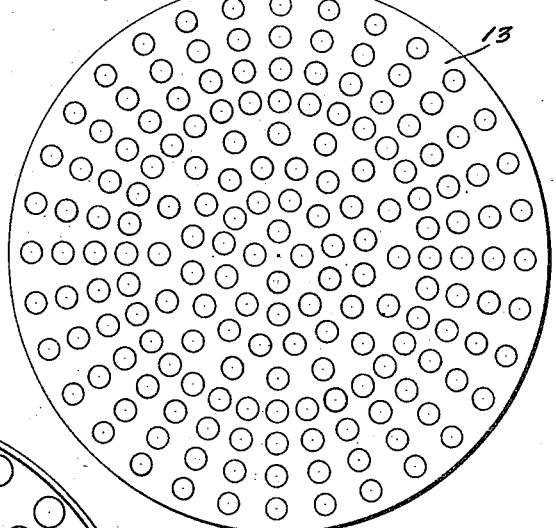
Figure 6:
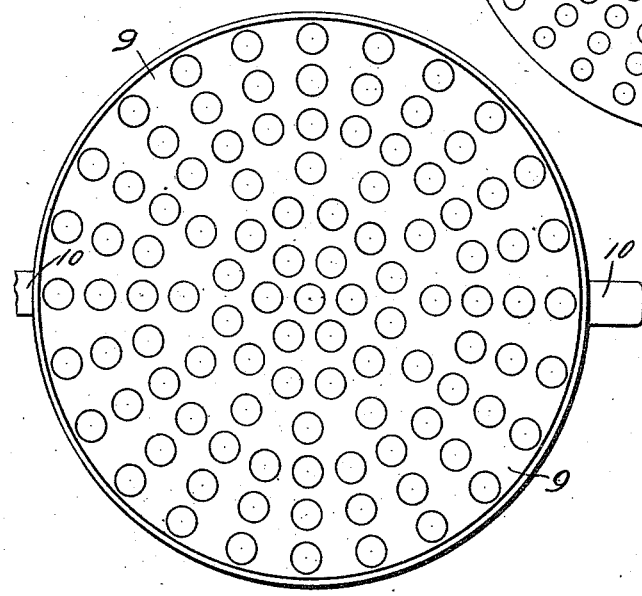

Figure 1 is a side elevation of a can provided with my improved strainer. Fig. 2 is a vertical section taken through the same. Fig. 3 is a plan. Fig 4 is a section taken on line 3—3 of Fig. 3 partly in section. Fig. 5 is a view on an enlarged scale of one of the perforated plates employed. Fig. 6 is a similar view of another perforated plate.

Like reference characters indicate corresponding parts throughout the several views.

1 is the milk can provided with a flared top 2 within which oppositely disposed stops 3 provided with alternately positioned latches 4 are secured.

5 is a handle the extremities of which are adapted for engagement with the latches 4 whereby it is held in position and a perforated cover 6 is bolted to the said handle as at 7, the lower edge of the said cover fitting snugly within the body of the can 1 and resting upon a shelf or cover support 8 which is bolted to the can.

9 is a perforated plate, the perforations being smaller than those of the cover 6, provided with lugs 10 by which it is bolted to the cover 6 as at 11 and beneath the plate 9 a strainer cloth 12 is removably disposed and held in position by a frictionally supported perforated plate 13 that fits snugly within the lower termination of the cover 6; the perforations in the plate 13 being smaller than those of the plate 9. By means of the handle 5 the entire strainer is readily removed from or inserted into the can. When the strainer is in position in the can and milk poured upon it the same will first pass through the perforations of the cover 6 which will prevent the passage of any large solid particles of foreign substance; from the cover the milk passes through the smaller perforations of the plate 9 and then through the strainer cloth whose mesh is sufficiently fine to strain the milk thoroughly and from the said cloth the milk will pass through the perforations of the supporting plate 13 into the can.

What I claim is:—

The combination with a can having a neck, a flared top and a cover support, of oppositely disposed stops provided with alternately positioned latches disposed within said flared top, a handle adapted for engagement with the said latches, a perforated cover secured to said handle adapted to rest upon the said cover support, a perforated plate secured to said perforated cover, a strainer cloth disposed beneath the last named plate and a perforated supporting plate frictionally engaging the said cover beneath the said strainer cloth.

In testimony that I claim the foregoing as my own I have hereto affixed my signature in the presence of two subscribing witnesses.

HERMAN NELSON.

Witnesses:
ELMER THELIN,
J. W. BROWDER.